US00RE38686E

(19) United States
(12) Reissued Patent
Loblick

(10) Patent Number: US RE38,686 E
(45) Date of Reissued Patent: Jan. 11, 2005

(54) SMOKE GENERATING APPARATUS

(75) Inventor: Norton M. Loblick, Edmonton (CA)

(73) Assignee: STAR EnviroTech, Inc., Costa Mesa, CA (US)

(21) Appl. No.: 10/057,218

(22) Filed: Jan. 24, 2002

Related U.S. Patent Documents

Reissue of:
(64) Patent No.: 6,018,615
Issued: Jan. 25, 2000
Appl. No.: 08/944,122
Filed: Oct. 6, 1997

(51) Int. Cl.[7] ..... F22B 29/06; F02M 15/04
(52) U.S. Cl. ..... 392/397; 261/142
(58) Field of Search ..... 392/386, 394, 392/396, 397, 398, 400, 401; 122/459, 460, 461, 462, 463, 476; 261/139, 142, DIG. 65

(56) References Cited

U.S. PATENT DOCUMENTS

| | | | |
|---|---|---|---|
| 3,563,224 | A | 2/1971 | Bryer |
| 3,851,146 | A | 11/1974 | Bennett |
| 3,861,292 | A | 1/1975 | Gilliland et al. |
| 3,964,304 | A | 6/1976 | Parrish |
| 4,558,196 | A | 12/1985 | Babasade |
| 4,764,660 | A | 8/1988 | Swiatosz |
| 5,344,319 | A | 9/1994 | Manzke |

*Primary Examiner*—Sang Paik
(74) *Attorney, Agent, or Firm*—Morland C. Fischer

(57) ABSTRACT

A smoke generating apparatus includes a combustion chamber having an air flow inlet and an air flow outlet. A helical heating element is disposed in the combustion chamber. The helical heating element has a central flow axis. A smoke generating fluid injection tube is positioned along the central flow axis of the helical heating element.

11 Claims, 2 Drawing Sheets

SMOKE GENERATING APPARATUS

Matter enclosed in heavy brackets [ ] appears in the original patent but forms no part of this reissue specification; matter printed in italics indicates the additions made by reissue.

FIELD OF THE INVENTION

The present invention relates to a smoke generating apparatus.

BACKGROUND OF THE INVENTION

U.S. Pat. No. 5,107,698 which issued to Gilliam in 1992 discloses a smoke generating apparatus. Smoke generating apparatus, such as those disclosed by Gilliam, are used to test for hairline cracks and similar leaks that are not detectable by visual inspection. The location of the leak is detected by observing smoke exiting from the leak. The Gilliam apparatus has a container in which is disposed a heating element. The container is filled with a smoke producing liquid until the liquid level reaches, without submerging, the heating element. An air pump forces a flow of air to bubble up through the smoke producing liquid, propelling the smoke producing liquid into contact with the heating element. Any of the smoke producing liquid coming in contact with the heating element is vaporized. When the smoke producing liquid is vaporized, it becomes smoke. As the flow of air exits the container it carries the smoke. The flow of air can be directed as required for testing purposes.

The Gilliam apparatus has limitations due to incomplete combustion. Particles of partially burned solution and unburned solution become entrained in the air flow and potentially can temporarily plug the leaks that the apparatus is supposed to be detecting.

SUMMARY OF THE INVENTION

What is required is a smoke generating apparatus that has improved combustion.

According to the present invention there is provided a smoke generating apparatus which includes a combustion chamber having an air flow inlet and an air flow outlet. A helical heating element is disposed in the combustion chamber. The helical heating element has a central flow axis. A smoke generating fluid injection tube is positioned along the central flow axis of the helical heating element. Means is provided for conveying smoke generating fluid to the smoke generating fluid injection tube. Means is provided for generating an air flow from the air flow inlet to the air flow outlet.

The smoke generating apparatus, as described above, with co-axial injection into a helical heating element provides more efficient combustion. Smoke generating fluid is injected onto the helical heating element, with the injection preferably angled upwardly toward an upper segment of the helical heating element. Any smoke generating fluid that is not immediately vaporized upon contact with the helical heating element falls by force of gravity onto a lower segment of the heating element. In addition, the helical heating element increases the surface area of heating element to which the smoke generating fluid is exposed. As will be hereinafter further described, it is preferred that the outer contact surface of the heating element be insulated, so that there is no direct contact between the smoke generating fluid and the current carrying core of the heating element.

Although beneficial results may be obtained through the use of the smoke generating apparatus, as described above, having the smoke generating fluid in the same chamber as the helical heating element unavoidably results in a heat build up which raises the temperature of the smoke generating fluid over time. This can cause operation problems by altering the viscosity of the smoke generating fluid. This can also cause safety concerns as heat builds in the chamber. Fuel to support combustion is present in the form of the smoke generating fluid, as is the oxygen to support combustion in the air flow through the combustion chamber. Another concern is that of fluid levels. The heating element will not work as intended if it is submerged. Care must, therefore, be taken to ensure that the heating element is not submerged as a result of overfilling or movement during use. Even more beneficial results may, therefore, be obtained when the smoke generating fluid is retained in a separate fluid reservoir.

Although beneficial results may be obtained through the use of the smoke generating apparatus, as described above, too much flow can flood the helical heating element. The preferred means for conveying smoke generating fluid from the reservoir to the smoke generating fluid injection tube includes a source of pressurized air, the pressurized air forces the smoke generating fluid along the injection tube to the helical heating element.

Although beneficial results may be obtained through the use of the smoke generating apparatus, as described above, only a small percentage of the smoke generating fluid vaporizes immediately upon contacting the helical heating element. The balance of the smoke generating fluid requires a few seconds to reach vaporizing temperature. It is, therefore, preferred that the means for conveying smoke generating fluid to the smoke generating fluid injection tube includes means for intermittent injection sequencing. This can be done in a number of ways, beneficial effects have been obtained through the use of a timing means to time an on phase and an off phase of an injection cycle.

Although beneficial results may be obtained through the use of the smoke generating apparatus, as described above, more precise control can be obtained over when the means for generating an air flow includes a source of pressurized air, a pressure regulator to limit the pressure in terms of pounds per square inch and a flow control regulator to control the flow to a specified number of litres per minute at a specified pressure.

Although beneficial results may be obtained through the use of the smoke generating apparatus, as described above, to the extent that there is incomplete combustion, it is preferred measures be taken to limit the products of incomplete combustion exiting the combustion chamber in the smoke. Even more beneficial effects may, therefore, be obtained when an outlet tube and an inlet tube are provided. The outlet tube extends from the air flow outlet into the combustion chamber terminating in a smoke receiving end. The inlet tube extends from the air flow inlet into the combustion chamber terminating in an air discharge end. The inlet tube has an inner diameter that is smaller than the inner diameter of the outlet tube. The inlet tube and the outlet tube are co-axially aligned. The positioning of the air discharge end of the inlet tube and the smoke receiving end of the outlet tube is configured to create a venturi effect to draw smoke from the combustion chamber. The only point of entry into the outlet tube is by means of the venturi. Products of incomplete combustion, therefore, tend to fall to the bottom of the combustion chamber after encountering the exterior of the outlet tube or the inlet tube.

Although beneficial results may be obtained through the use of the smoke generating apparatus, as described above, the majority of units tested do not leak. Even more beneficial results may, therefore, be provided when three operating modes are provided. A first operating mode provides power only to the means for generating an air flow from the air flow inlet to the air flow outlet and includes means for measuring pressure loss. This enables the unit to be tested for leaks without generating smoke. If the unit leaks there will be a pressure loss. It is only when a pressure loss is noted indicating the presence of a leak, that smoke need be used to locate the leak. A second operating mode provides power to the helical heating element to preheat said helical heating element. Of course, the smoke generating fluid will only turn to smoke when subjected to heat. If smoke generating fluid is being pumped into the combustion chamber onto a helical heating element that has not, as yet, reached its vaporizing temperature, injected fluid could eventually submerge the heating element rendering the unit non-functional. A third operating mode provides power to all systems to heat the helical heating element, inject smoke generating fluid by means of pressurized air onto the helical heating element and create an air flow of pressurized air to draw smoke out the outlet of the combustion chamber.

Although beneficial results may be obtained through the use of the smoke generating apparatus, as described above, there remains a safety hazard should a short occur. Even more beneficial results may, therefore, be obtained when the helical heating element is insulated. When helical heating element is insulated it will not short out. When helical heating element is insulated a larger diameter wire may be used and the surface area exposure of the smoke generating fluid to heat is further increased.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
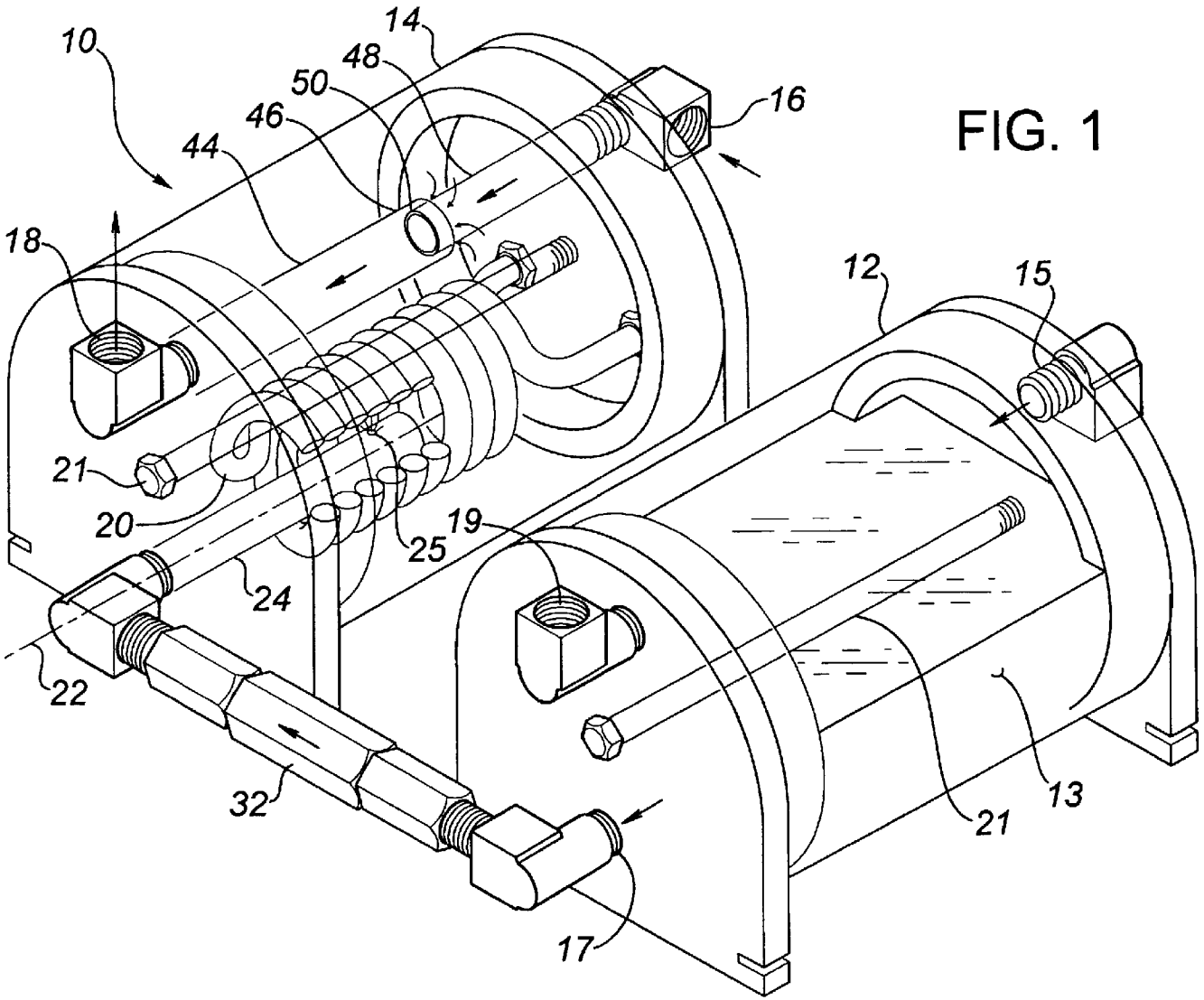
FIG. 1 is a cutaway perspective view of a smoke generating apparatus constructed in accordance with the teachings of the present invention.

The preferred embodiment, a smoke generating apparatus generally identified by reference numeral 10, will now be described with reference to FIGS. 1 and 2.

Figure 2:
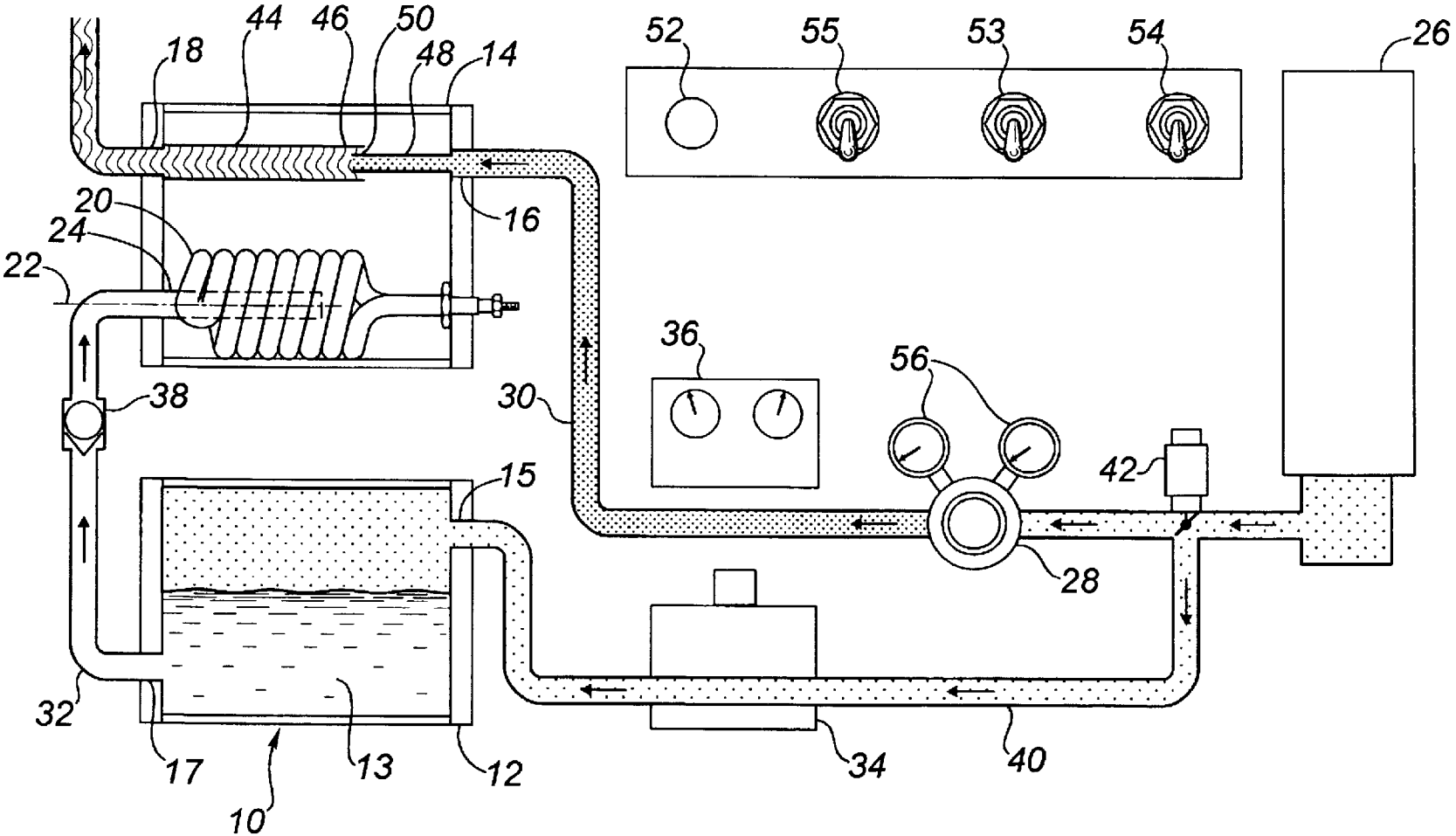
FIG. 2 is a top plan view of the smoke generating apparatus illustrated in FIG. 1, together with controls associated therewith.

Referring to FIG. 1, smoke generating apparatus 10 includes a reservoir 12 for smoke generating fluid 13 and a separate combustion chamber 14. Reservoir 12 has an air flow inlet 15 and a smoke generating fluid flow outlet 17. Reservoir 12 also has a port 19 to enable the addition of smoke generating fluid 13. Combustion chamber 14 has an air flow inlet 16 and an air flow outlet 18. The particular construction of reservoir 12 and combustion chamber 14 illustrated use clamping rods 21 to hold the components together. An insulated helical heating element 20 is disposed in combustion chamber 14. Helical heating element 20 has a central axis 22. A smoke generating fluid injection tube 24 is positioned along central axis 22 of helical heating element 20. Injection tube 24 has at least one upwardly angled injection port 25. Referring to FIG. 2, the controls associated with smoke generating apparatus 10 include a source of pressurized air 26 and a regulator 28 for controlling flow and pressure. It will be appreciated that while air will be used for most applications, there may be applications in which it is preferred that an inert gaseous carrier be used. Source of pressurized air 26 provides air to a first air flow conduit 30 and a second air flow conduit 40. Second air flow conduit 40 connects source of pressurized air 26 to reservoir 12. A valve 34 is provided on second air flow conduit 40. Valve 34 is controlled by a timer 36. A connecting flow conduit 32 connects reservoir 12 to smoke generating fluid injection tube 24. A one way check valve 38 is provided on connecting flow conduit 32 which permits flow in only one direction, that being from reservoir 12 to smoke generating fluid injection tube 24. First air flow conduit 30 extends from source of pressurized air 26 to air flow inlet 16 of combustion chamber 14. A safety release valve 42 is provided at a junction where source of pressurized air 26 is connected to first air flow conduit 30 and second air flow conduit 40. Valve 42 is an optional safety feature that releases air pressure should the flow through first air flow conduit 30 or second air flow conduit 40 become blocked. An outlet tube 44 extends from air flow outlet 18 into combustion chamber 14 terminating in a smoke receiving end 46. An inlet tube 48 extends from air flow inlet 16 into combustion chamber 46, terminating in an air discharge end 50. Inlet tube 48 has an inner diameter that is smaller than the inner diameter of outlet tube 44. Inlet tube 48 and outlet tube 44 are co-axially aligned. The relative positioning of air discharge end 50 of inlet tube 48 and smoke receiving end 46 of outlet tube 44 is selected to create a venturi effect to draw smoke from combustion chamber 14. A venturi is a well known engineering principle and will, therefore, not be further explained. A power supply connection 52 enables power to be supplied to all the above described components. Associated with power supply connection 52 are switches 53, 54 and 55 which allow a selection of various operating modes, as will hereinafter be further described in association with the use and operation of smoke generating apparatus 10. Switch 53 activates heating element 20. Switch 54 activates air pump 26. Switch 55 activates valve 34 and associated timer controls 36. Gauges 56 are connected to the air supply circuit to monitor whether a pressure loss is occurring during testing.

The use and operation of smoke generating apparatus 10 will now be described with reference to FIGS. 1 and 2. When testing a unit, it should first be determined whether the unit is leaking. Of course, if the unit is not leaking there is no need to generate smoke. Switch 54 is used to start air pump 26 allowing operation in a first operating mode. In the first operating mode power is supplied only to source of pressurized air 26. Solenoid valve 34 is maintained in a closed position blocking second air flow conduit 40, to that air only passes through first air flow conduit 30. Source of pressurized air 26 generates an air flow through first air flow conduit 30 and through combustion chamber 14 from an air flow inlet 16 to air flow outlet 18. In this first operating mode no combustion is taking place. By monitoring gauges 56, one can determine whether a pressure loss is occurring which is indicative of a leak. Should it be determined that there is a leak, steps must be taken to determine the location of the leak. As a preliminary step, switch 53 is used to turn on heating element 20 to facilitate a second operating mode. The second operating mode is merely a standby mode in which power is supplied to helical heating element 20 to allow it to become preheated to an operating temperature sufficient to vaporize a selected smoke generating fluid being used. Once helical heating element 20 has attained operating temperature, switch 55 is used to turn on valve 34 and associated timer 36 to facilitate a third operating mode.

In the third operating mode power is supplied to all systems necessary to generate smoke. Pressurized air from pressurized air source 26 is directed along second air flow conduit 40 through reservoir 12. As pressurized air passes enters into reservoir 12, the air pressure forces smoke generating fluid 13 from reservoir 12, through connecting flow conduit 32 to smoke generating fluid injection tube 24. Smoke generating fluid injection tube 24 injects smoke generating fluid at an upward angle through injection port 25 onto an upper portion of helical heating element 20. A portion of the smoke generating fluid vaporizes immediately upon contact with helical heating element 20, the balance is vaporized as it falls or upon contact with a lower portion of helical heating element 20. The injection of smoke generating fluid is not done on a continuous basis, but preferably is performed in a injection cycle that has an "on " phase and an "off" phase. This is accomplished by having valve 34 controlled by timer 36, to provide timer controlled intermittent injection sequencing of pressurized air along second air flow conduit 40. The only point of egress from combustion chamber 14 is through air flow outlet 18. In order to reach air flow outlet 18 smoke must enter smoke receiving end 46 of outlet tube 44 where a venturi is created due to the relative positioning of air discharge end 50 of inlet tube 48. Smoke tends to be drawn by the venturi into outlet tube 44. Products of incomplete combustion tend to fall to the bottom of combustion chamber 14 as they do not remain air borne long enough to be drawn through the venturi.

In the illustrated embodiment, the solenoid actuated valve 34, in conjunction with the timer 36, regulates the impulse rate of pressurized air into the reservoir 12. The advantage of this configuration is generally one of physical space requirements. The disadvantage is that the inherent compressibility of air under pressure makes it somewhat more difficult to accurately regulate the fluid flow from the reservoir. It will be apparent to one skilled in the art that the solenoid valve could alternatively be positioned on the connecting flow conduit. This alternative, while preferable from a fluid regulation standpoint, has limitations due to larger space requirements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A smoke generating apparatus, comprising:

a combustion chamber having an air flow inlet and an air flow outlet;

a heating element disposed in the combustion chamber, the heating element having a central flow axis;

a smoke generating fluid injection tube positioned [along the central flow axis of] *in alignment with* the heating element;

means for conveying smoke generating fluid to the smoke generating fluid injection tube; and means for generating an air flow through the combustion chamber from the air flow inlet to the air flow outlet;

at least two operating modes being provided including one operating mode in which power is supplied only to the means for generating an air flow from the air flow inlet to the air flow outlet and one operating mode in which power is applied to all systems to heat the heating element, inject smoke generating fluid by means of pressurized air onto the [helical] heating element and create and air flow of pressurized air to draw smoke out the outlet of the combustion chamber.

2. The smoke generating apparatus as defined in claim 1, wherein smoke generating fluid is retained in a separate fluid reservoir.

3. The smoke generating apparatus as defined in claim 1, wherein the means for conveying smoke generating fluid to the smoke generating fluid injection tube includes a source of pressurized air, the pressurized air forcing the smoke generating fluid along the smoke generating fluid injection tube to the heating element.

4. The smoke generating apparatus as defined in claim 1, wherein the means for conveying smoke generating fluid to the smoke generating fluid injection tube includes means for intermittent injection sequencing.

5. The smoke generating apparatus as defined in claim 4, wherein the means of intermittent injection sequencing includes timing means.

6. The smoke generating apparatus as defined in claim 1, wherein the means for generating an air flow includes a source of pressurized air, a pressure/flow control regulator.

7. The smoke generating apparatus as defined in claim 1, wherein an outlet tube extends from the air flow outlet into the combustion chamber terminating in a smoke receiving end, an inlet tube extends from the air flow inlet into the combustion chamber terminating in an air discharge end, the inlet tube has an inner diameter that is smaller than the inner diameter of the outlet tube, the inlet tube and the outlet tube are co-axially aligned with the positioning of the air discharge end of the inlet tube and the smoke receiving end of the outlet tube being configured to create a venturi effect to draw smoke from the combustion chamber.

8. The smoke generating apparatus as defined in claim 1, wherein the heating element is helical.

9. The smoke generating apparatus as defined in claim 8, wherein the helical heating element is insulated.

10. A smoke generating apparatus, comprising:

a reservoir for smoke generating fluid;

a combustion chamber having an air flow inlet and an air flow outlet, the combustion chamber being separate from the reservoir;

[an helical] *a* heating element disposed in the combustion chamber, the [helical] heating element having a central flow axis;

a smoke generating fluid injection tube positioned [along the central flow axis of] *in alignment with* the [helical] heating element;

means for conveying smoke generating fluid from the reservoir to the smoke generating fluid injection tube, the means for conveying smoke generating fluid to the smoke generating fluid injection tube including a source of pressurized air, such that the pressurized air forces smoke generating fluid through the smoke generating fluid injection tube to the [helical] heating element, the means for conveying smoke generating fluid to the smoke generating fluid injection tube further including a timer controlled air valve for intermittent injection sequencing of smoke generating fluid;

means for generating an air flow from the air flow inlet to the air flow outlet; and an outlet tube extending from the air flow outlet into the combustion chamber and terminating in a smoke receiving end, an inlet tube extending from the air flow inlet into the combustion chamber and terminating in an air discharge end, the inlet tube having an inner diameter that is smaller than the inner diameter of the outlet tube, the inlet tube and the outlet tube being co-axially aligned, the positioning of the air discharge end of the inlet tube and the smoke receiving end of the outlet tube being configured to create a venturi effect to draw smoke from the combustion chamber.

11. A smoke generating apparatus, comprising:

a reservoir for smoke generating fluid;

a combustion chamber having an air flow inlet and an air flow outlet, the combustion chamber being separate from the reservoir;

an insulated [helical] heating element disposed in the combustion chamber, the [helical] heating element having a central flow axis;

a smoke generating fluid injection tube positioned [along the central flow axis of] *in alignment with* the [helical] heating element;

a source of pressurized air including a pressure regulator;

a first air flow conduit extending from the source of pressurized air to the air flow inlet of the combustion chamber;

a second air flow conduit connecting the source of pressurized air to the reservoir with a connecting flow conduit connecting the reservoir to the smoke generating fluid injection tube, such that pressurized air passing from the second air flow conduit into the reservoir forces smoke generating fluid from the reservoir through the connecting flow conduit to the smoke generating fluid injection tube whereby the smoke generating fluid is injected onto the [helical] heating element where it vaporizes;

a timer controlled valve on one of the second air flow conduit and the connecting flow conduit thereby providing timer controlled intermittent injection sequencing of smoke generating fluid;

an outlet tube extending from the air flow outlet into the combustion chamber and terminating in a smoke receiving end, an inlet tube extending from the air flow inlet into the combustion chamber and terminating in an air discharge end, the inlet tube having an inner diameter that is smaller than the inner diameter of the outlet tube, the inlet tube and the outlet tube being co-axially aligned, the positioning of the air discharge end of the inlet tube and the smoke receiving end of the outlet tube being configured to create a venturi effect to draw smoke from the combustion chamber; and a power supply, the power supply providing at least two operating modes, including one operating mode in which power is supplied only to the means for generating an air flow from the air flow inlet to the air flow outlet; and one operating mode in which power is supplied to all systems to heat the helical heating element, inject smoke generating fluid by means of pressurized air onto the helical heating element and create an air flow of pressurized air to draw smoke out the outlet of the combustion chamber.

* * * * *